United States Patent [19]

Lichtenstein

[11] Patent Number: 4,788,525

[45] Date of Patent: Nov. 29, 1988

[54] ELECTRIC PNEUMATIC PRESSURE SENSOR

[76] Inventor: Bruno Lichtenstein, Rue Barreto Leite 87, Porto Alegre, Brazil

[21] Appl. No.: 45,791

[22] Filed: Apr. 10, 1987

Related U.S. Application Data

[63] Continuation of Ser. No. 750,751, Jun. 28, 1985, abandoned.

[30] Foreign Application Priority Data

Jul. 10, 1984 [BR] Brazil ................................. 8403488

[51] Int. Cl.⁴ .............................................. B60C 23/02
[52] U.S. Cl. .................................. 340/58; 200/61.25; 73/146.5
[58] Field of Search .......................... 340/58, 614, 626; 73/744, 745, 146.5, 146.8; 116/34 R; 200/61.22, 61.25, 61.26, 82 R, 82 D

[56] References Cited

U.S. PATENT DOCUMENTS

| | | | |
|---|---|---|---|
| 2,040,891 | 5/1936 | Wright et al. | 200/61.25 |
| 2,948,256 | 8/1960 | Tapp | 116/34 R |
| 3,987,407 | 10/1976 | Bruner | 340/58 |
| 3,999,431 | 12/1976 | Makarainen | 340/58 X |
| 4,090,172 | 5/1978 | Vesnic | 340/58 |

Primary Examiner—Joseph A. Orsino
Assistant Examiner—Brian R. Tumm
Attorney, Agent, or Firm—Michael J. Striker

[57] ABSTRACT

A vehicle tire pressure indicator having a housing defining an inner chamber, an electrically insulated contact tube communicating with the inner chamber, a piston movable toward and away from the contact tube guided by the inner chamber, and an elastic seal engaged with the piston and movable in its entirety with the piston along an inner surface of the inner chamber to seal the inner chamber. A tube communicates the contact tube with the vehicle tire so that a pressure in the inner chamber corresponds to the tire pressure. The contact tube is electrically connected to alarms mounted in the cabin of the vehicle. On low pressure, the piston biases into contact with the contact tube to thereby activate the alarms to warn a truck driver of low tire pressure. The vehicle tire pressure indicator is easily mounted in the center rim of a tire by a truck driver.

10 Claims, 6 Drawing Sheets

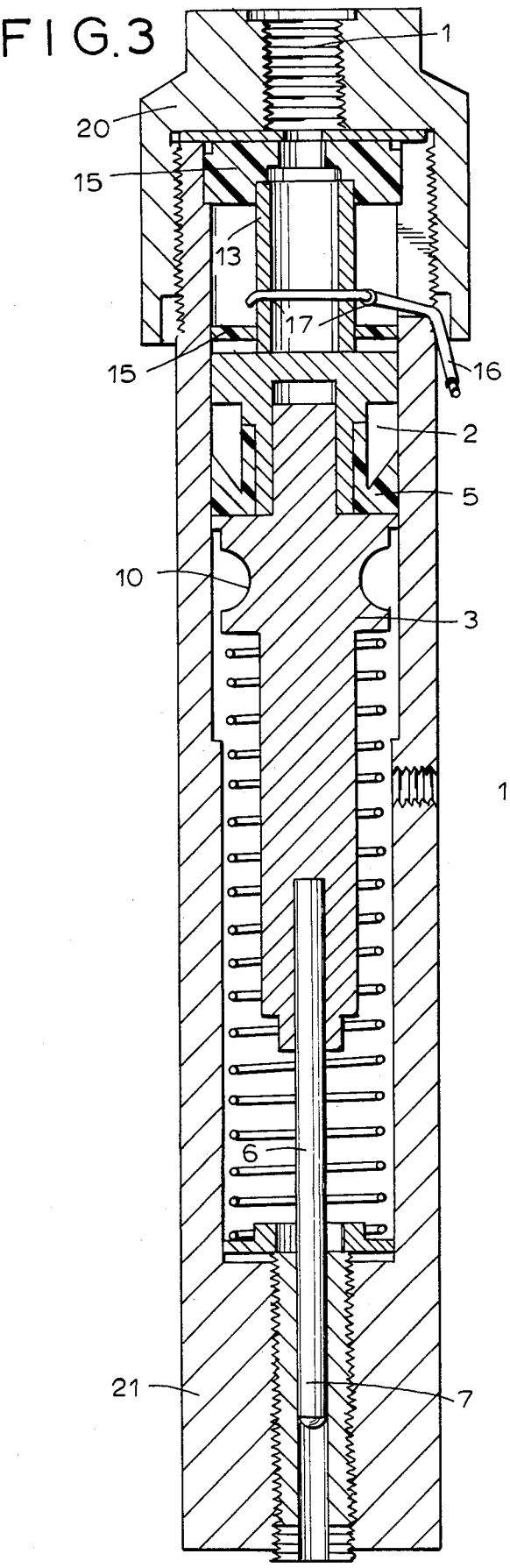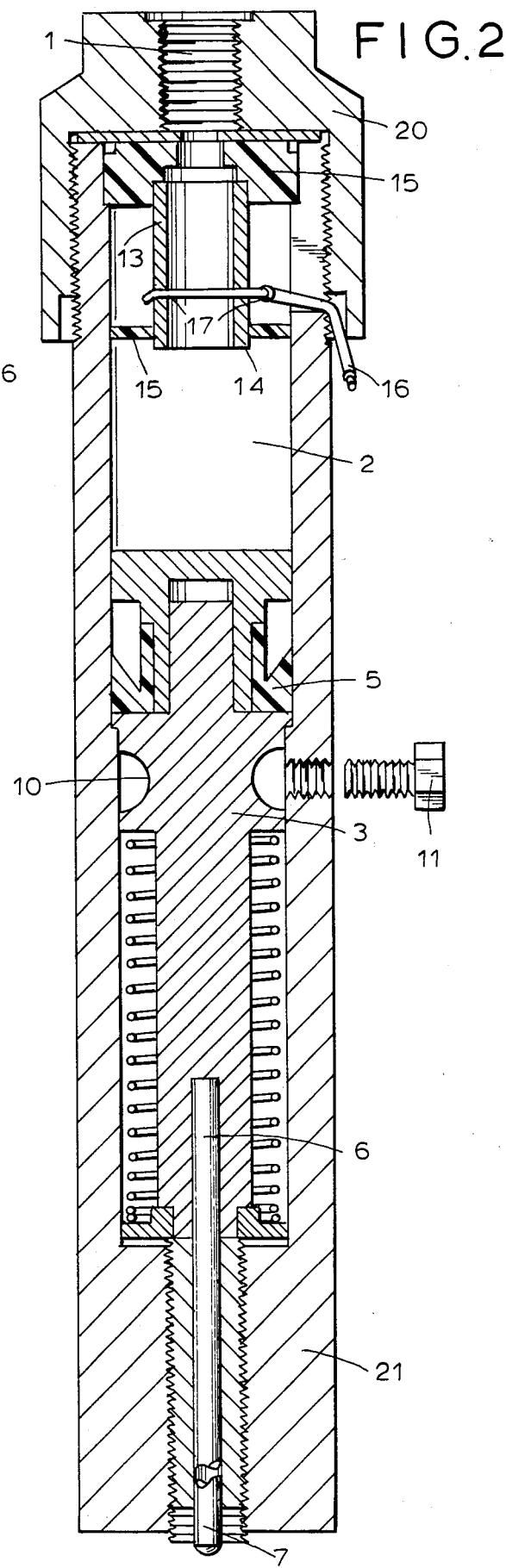

FIG. 6
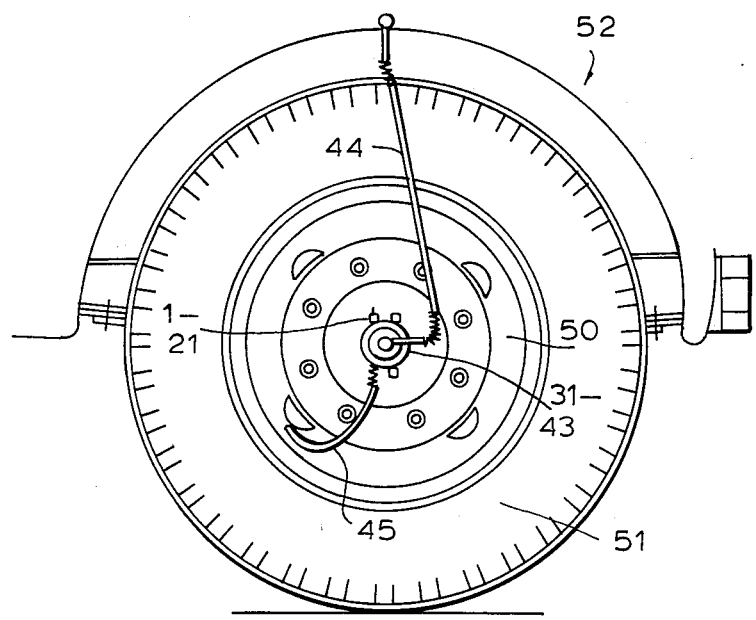
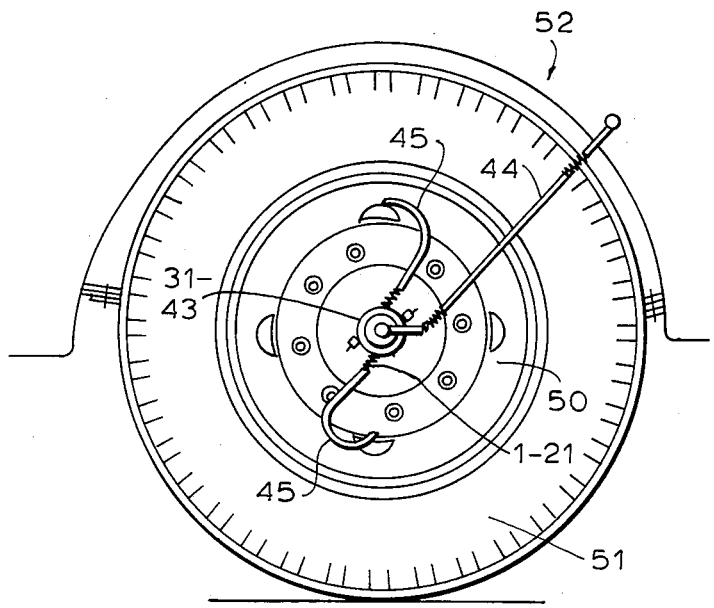
FIG. 7

ELECTRIC PNEUMATIC PRESSURE SENSOR

This is a continuation of application Ser. No. 750,751, filed June 28, 1985, now abandoned.

FIELD OF THE INVENTION

The invention relates generally to a device for monitoring the tire pressure of trucks, buses and large earth moving machines.

BACKGROUND OF THE INVENTION

Tires, as statistically demonstrated, are the second largest item of expense for large vehicles and primarily responsible for the accidents on roads.

When the tires of a vehicle have LOW PRESSURE, it may expend up to 15% more fuel.

All modern vehicles have power steering systems, so the driver does not feel when a front wheel has low pressure; and in the back axles, there are always double tires, so it is even more difficult to feel the loss of pressure, because the tire with low pressure, automatically transfers its load to the other tire-overloading and diminishing its durability.

All tire manufacturers claim that more than 80% of damaged tires, originated by LOW PRESSURE.

SUMMARY OF THE INVENTION

The main carateristic of this sensor is its simplicity and reliability to permit its use under extreme conditions with great mechanical vibrations and sudden changes of temperature.

This sensor is specifically designed to monitor the tire pressure of trucks, buses and large earth moving machines. The sensor is easy to mount, completely external and independent without causing any interference on mechanical parts of the vehicle. The sensor it can be mounted by the manufacturer of the vehicle and integrated, even under the smaller (miniaturized) version.

The principle of this sensor, is so simple that there are a great number of possible applications. The sensor eliminates wasteful tire expenses, in a very simple way, advoids LOW PRESSURE with accoustic and optic alarms; if desired, the sensor can even stop the vehicle, by cutting off the fuel. The sensor is small, reliable and cheap. It alerts the driver when one of his tires lowers to a pre-set pressure, avoiding damage to the tire and the vehicle. The transmission of the signal from the sensor, mounted on the wheel of the vehicle, to the cabin, where the driver sits, can be made in several ways:: By RADIO—or ULTRA SOUND DEVICES—or MAGNETIC HEAD—or PHYSICAL ELECTRIC ISOLATED WIRE.

The most simple and cheapest way is by wire. The wire is visible and the low voltage of the electric system of the vehicle (12 V-D.C.) permits handling by every truck driver.

So the transmission by wire was chosen to make it simple, using the same electrical system of the vehicle to permit the mounting of the sensor and transmission by the truck driver himself. Yet, the sensor and its acessories are all mounted externally, independent, without causing any interference on the mechanics of the vehicle.

Perhaps in the future, the sensor may be placed by the manufacturer of the vehicle integrated into the mechanics. The basic principle of the sensor is so simple and flexible, that it can be used in every vehicle with tires under pressure. Today, the sensor and its accessories (with transmission by wire) is produced in an industrial scale. For a standard vehicle, with six wheels, it will cost only the price of one tire.

The savings in tires and fuel, pay for this equipment within 90 days of use. The sensor closes an electric circuit, when the pressure decreases to a pre-set value, sending an electric command current of a very low intensity (ca. 0.017 A under 12 V-D.C.) to a small electronic box mounted on the panel (instrumentation panel) of the driver's cabin. In this small electronic box are mounted the alarms-accoustic (by a small loud speaker) and optic (by LED lamps, one indicating LED lamp for each semi-axle).

The alarm box is fed by electric energy through the electric system of the vehicle, when the key of the truck is turned on. The alarms do not stop, until the low pressure of the tire is corrected.

If desired, even the flow of fuel may be stopped, to avoid the movement of the vehicle, when there is low pressure in one of the tires. The sensor has in one of its ends, a pressure indicator stem, which comes more or less out of the body of the sensor, indicating more or less pressure—so the driver can immediately see or feel, in the back axles with double tires, which of these, has low pressure.

The stem can even work as a pressure gauge, indicating approximately when the tire has the right pressure if the driver uses the air compressor of the vehicle, to fill up his tires. The sensors (two, when there are double tires), are mounted and connected, on a small support box, which rotates with the wheels of the vehicle.

This support box is mounted externally, on the center of the wheel.

The cover of the support box remains fixed, around a ball bearing mounted on a hollow axle.

The hollow axle has a small metallic pin isolated electrically. This is pressed against the cover to conduct the small electric commanding current of very low intensity (ca. 0.017 A in 12 V DC) to the electric wire, which will conduct this commanding current to the cabin of the vehicle.

The electric wire is protected by metallic tubes, connected by flexible springs, to permit free vibrations, together with the wheels of the vehicle.

The electronic alarm box, mounted in the cabin, is fed by the electric system of the vehicle, through the key contact—when the key is turned on, the sensors will immediately work.

BRIEF DISCRIPTION OF THE DRAWINGS

FIGS. 2 and 3 are longitudinal cross-sections of the sensor of FIG. 1 in assembled condition, depicting the sensor respectively in two operative positions. Electrical contact is broken in FIG. 2 due to sufficient pressure levels and electrical contact is established in FIG. 3 due to lower pressure levels.

FIG. 6 shows the sensor and support box mounted in position on a simple tire on the front axle.

FIG. 7 shows the sensor and support box mounted in position on a double tire on the back axle.

DETAILED DESCRIPTION OF THE PREFERRED EMBODIMENTS

Figure 1:
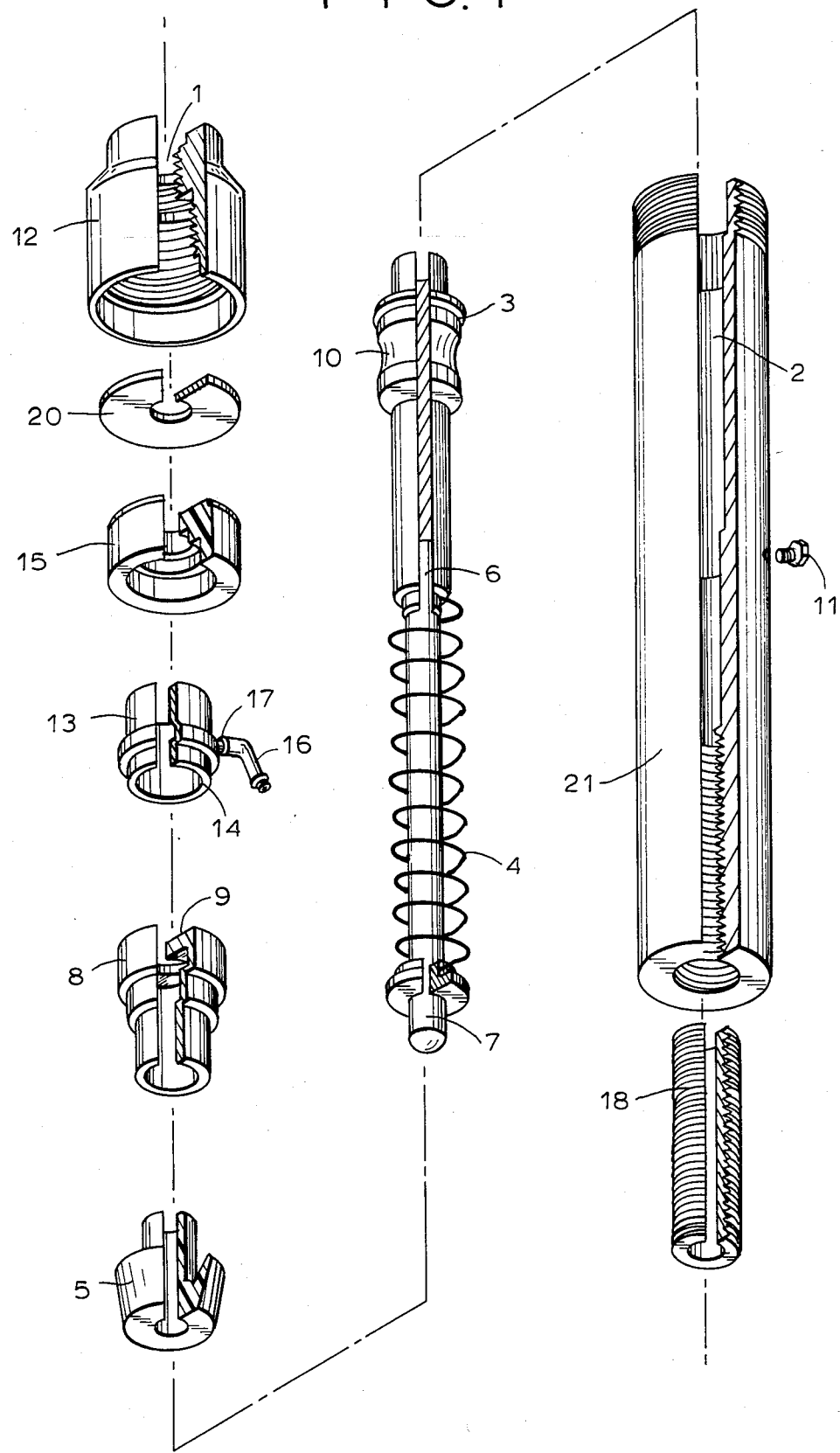
FIG. 1 shows an exploded view of the sensor in accordance with the present invention.

FIGS. 1–3 The sensor is formed by a small cylindrical body (21). The compressed air comes in through opening (1) where the flexible hoses (FIG. 10) are connected.

The compressed air fills the high pressure chamber, (2) and presses the piston (3) downwards against the calibrated spring (4), keeping a dynamical equilibrium (balance) which resists strong mechanical vibrations and sudden changes of temperature.

The high pressure chamber is sealed against the lower part of the sensor, where the calibrated spring (4) is under atmospheric pressure, by a synthetic rubber retainer (5) which has a special profile, normally used for sealing the large pressure differences existing together with great mechanical vibrations.

The piston (3) has, in its lower extremity, a stem (6), which comes out of the body of the sensor, working as a calibrator (pressure gauge) indicating if the pressure of the tire is correct or low, by coming more or less out of the sensor body.

On the upper extremity of the piston (3) is the contact head (8) which has two purposes:

it permits fixing the syntetic rubber retainer (5);

its contact surface (9) is silvered to avoid oxidation which would make it difficult to transmit the small electric command current.

The circular cavity (10) of the piston has the purpose of permitting the assemblage of the upper part of the sensor and serves to permit the fixation of the sensor in the support box.

On the upper side of the sensor exists the contact tube (13), which permits the in flow of the compressed air to the high—pressure chamber (2).

The contact tube (13) has its contact surface (14) also silvered to prevent oxidation and is isolated electrically, from the wall of the sensor, by two plastic pieces (15) which hold the tube strongly in its central position.

The contact tube (13) is connected electrically by the wire (16) welded to the tube.

This common electric wire (16) is sealed by the cover of the sensor and conducts the commanding electric current, which triggers the alarm in the alarm box in the cabin.

On the lower side of the sensor, the regulator screw (18) permits the fine adjustment of the tension of the calibrated spring (14) for pre-setting the alarm pressure (that means, to precisely regulate the pressure, when the alarms ought to start working or, in other words, when the contacts (19) comprising surfaces (9,14) become closed.

This alarm pressure depends uppon the type of the tires, the vehicle and its load.

The contact tube is electrically isolated from the ground so that when the two surfaces 9 and 14 are in contact, the electric circuit is completed through the grounded surface 9, which acts like the negative pole for the battery of the truck which is normally connected to the chassis. Thus, the small alarm current (0.017 Amps) starts to flow through the electrically isolated wire 16, which triggers the alarms in the alarm box of FIG. 4 in the cabin.

Element 17 indicates the soldering points, at which the wire 16 is soldered to the contact tube 13. Both the contact tube and wire 16 are electrically isolated from the grounded body 21 of the sensor and held in position by pieces 15.

Element 11 is a simple screw to permit the assemblage of the sensor by holding the piston 3 down when the cap 12 is fixed to seal the high pressure chamber 2 and the wire 16 against the atmosphere.

Figure 5:
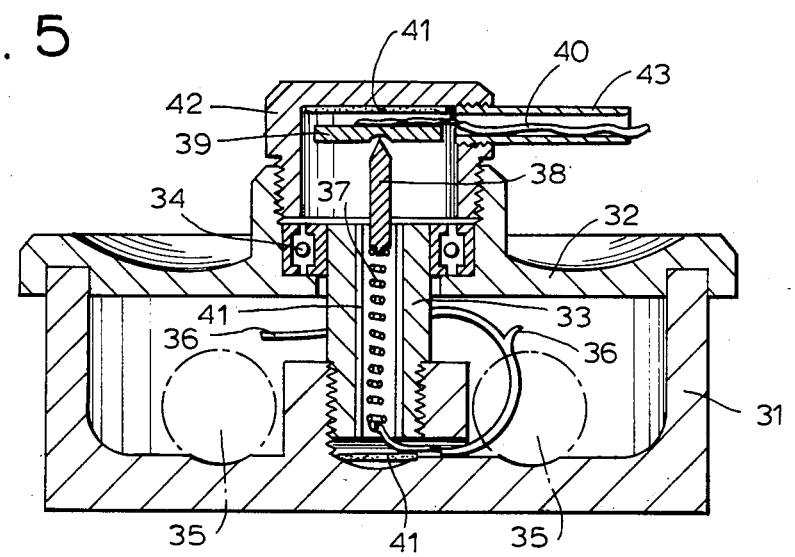
FIG. 5 shows a cross-section of the support box of FIG. 4 after assembly.
Figure 4:
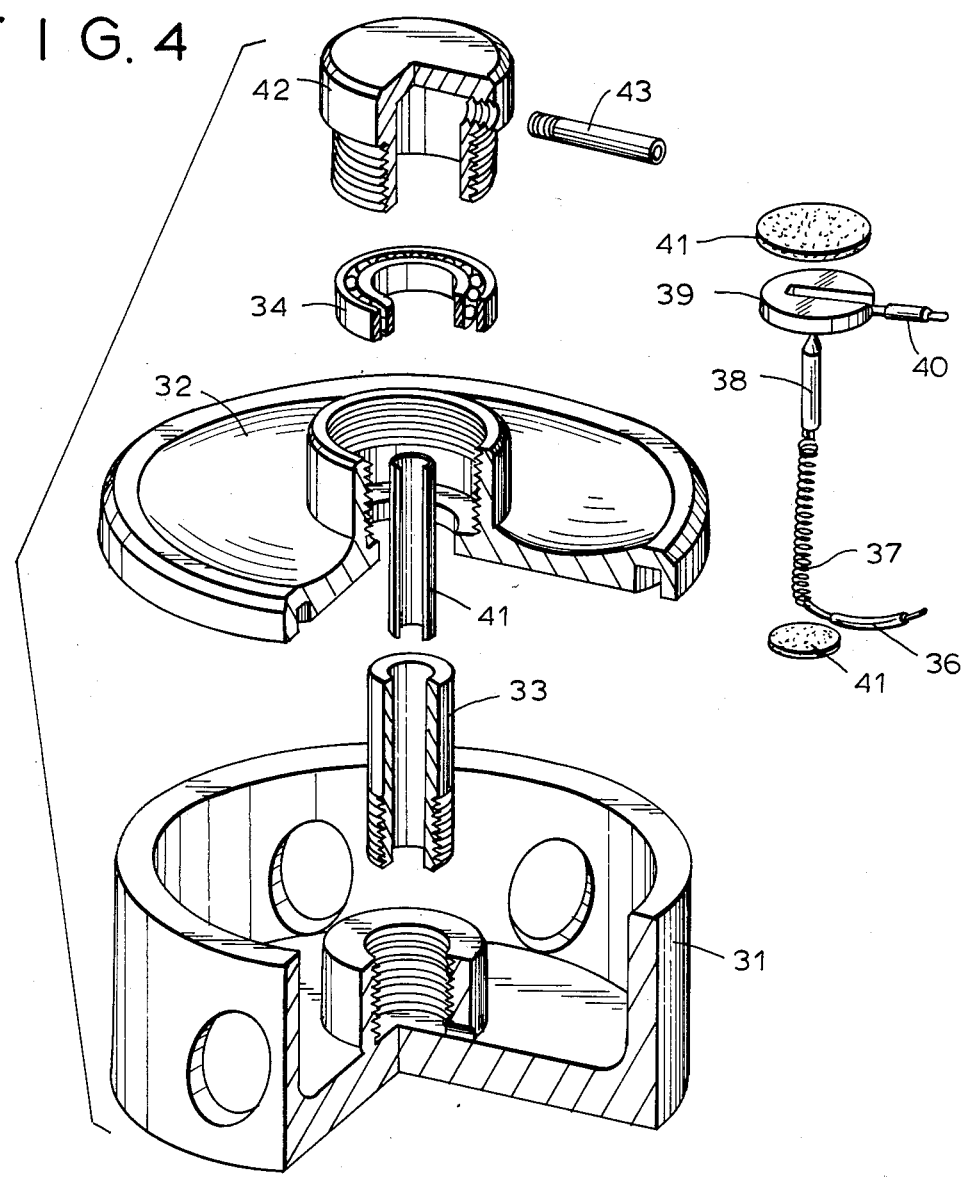
FIG. 4 shows an exploded view in partial cross-section of a mountable support box for the present sensor.

FIGS. 4 and 5 The support box is a small cylindrical piece, which has two parts.—The fixed part (31) and the wheeling (rotating) cover (32).

The cover rotates around the hollow axle (33) guided by the ball bearing (34) and is fixed in its place by the piece (42). The sensors (35) are transversely mounted to keep its extremities out of the perimeter of the support box.

The free extremities permit the connection of the sensors by the flexible hoses to the tires and to meter the pressure by observing the calibrator stem.

The electric wire of the sensors (36) is welded to the spring (37) for transmission of the electric commanding current by the metallic pin (38) to the metal plate (39). All these parts, spring (37), metal pin (38) and plate (39) are electrically isolated from the ground. (41)

The electric flexible wire (40) is welded to the metal plate (39) and it goes, through the protection tubes (43) up to the cabin of the vehicle.

The wire 16 of the sensor (one or two sensors corresponding with one or two tires) is connected electrically to the wire 36 and both are isolated from the ground. The grounded elements 41, cylindrical and disc shaped, isolate the conductive elements 37, 38, 39 from the ground.

The support box rotates with the tires (as installed in FIG. 3) and a small electric alarm current must be transmitted to the alarm box in the cabin. For this purpose, the central pin 38 is pressed by the spring 37 against the plate 39. From here, the wire 40 heads for the alarm box in the driver's cabin. These conductive elements 37, 38, 39 are isolated from the ground by cylindrical and disc-shaped grounded elements 41.

FIGS. 6 and 7—This represents a view of the whole assemblage, mounted on the front and back wheels, indicating one sensor on the front and two sensors on the back axles.

The figure shows, how the blindage (protection) tubes are interconnected by springs to permit mechanical vibration of the wheels.

There is clearly a difference between front and back axle mountings, because the front wheels have directional and vertical motion; and the back wheels have only vertical motion and vibration.

The sensor 1–21 has a portion of the cylindrical body 21, a visible portion 7 of the stem 6, and a cap 12 projecting radially outside of the support box 32. The support box 32 is mounted on a wheel 50 of a tire 51 for a truck body 52. Blindage tubes 44 and flexible hoses 45 are shown.

Figure 8:
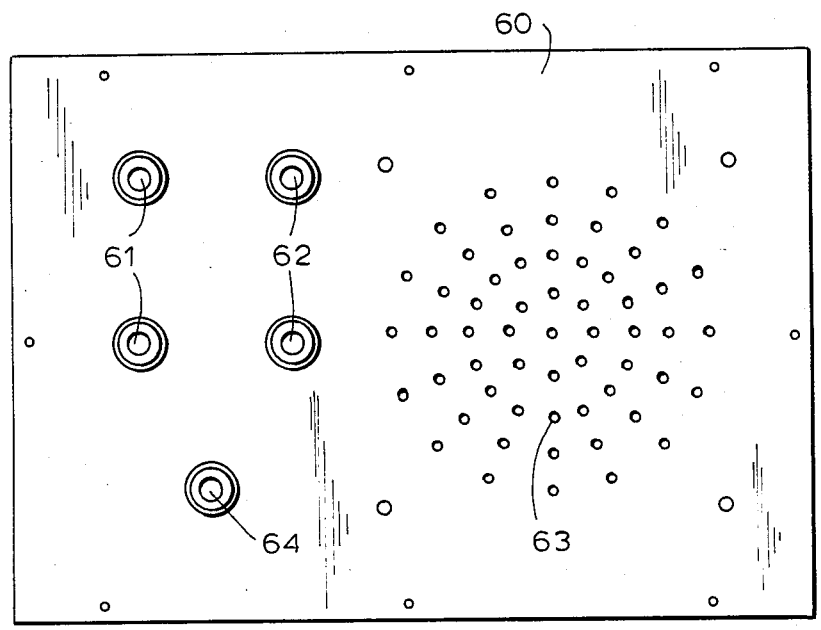
FIG. 8 shows a front view of an alarm box of the present invention.
Figure 9:
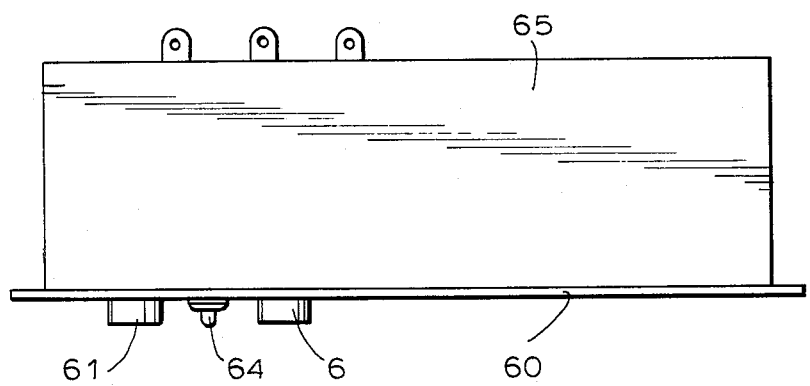
FIG. 9 shows a top view of the alarm box of FIG. 8.

FIGS. 8 and 9 show an alarm box which is to be mounted in the driver's cabin or under an instrument panel. The box has a front panel 60 and body 65. The alarm box has four LED indicator lamps 61 to provide an optical alarm of one LED lamp for each half axle, each lamp 61 being give a designation 62 in acordance with a respective half axle. The alarm box also has a small loud speaker 63 to provide the accoustical alarm. A test button 64 is provided.

Figure 10:
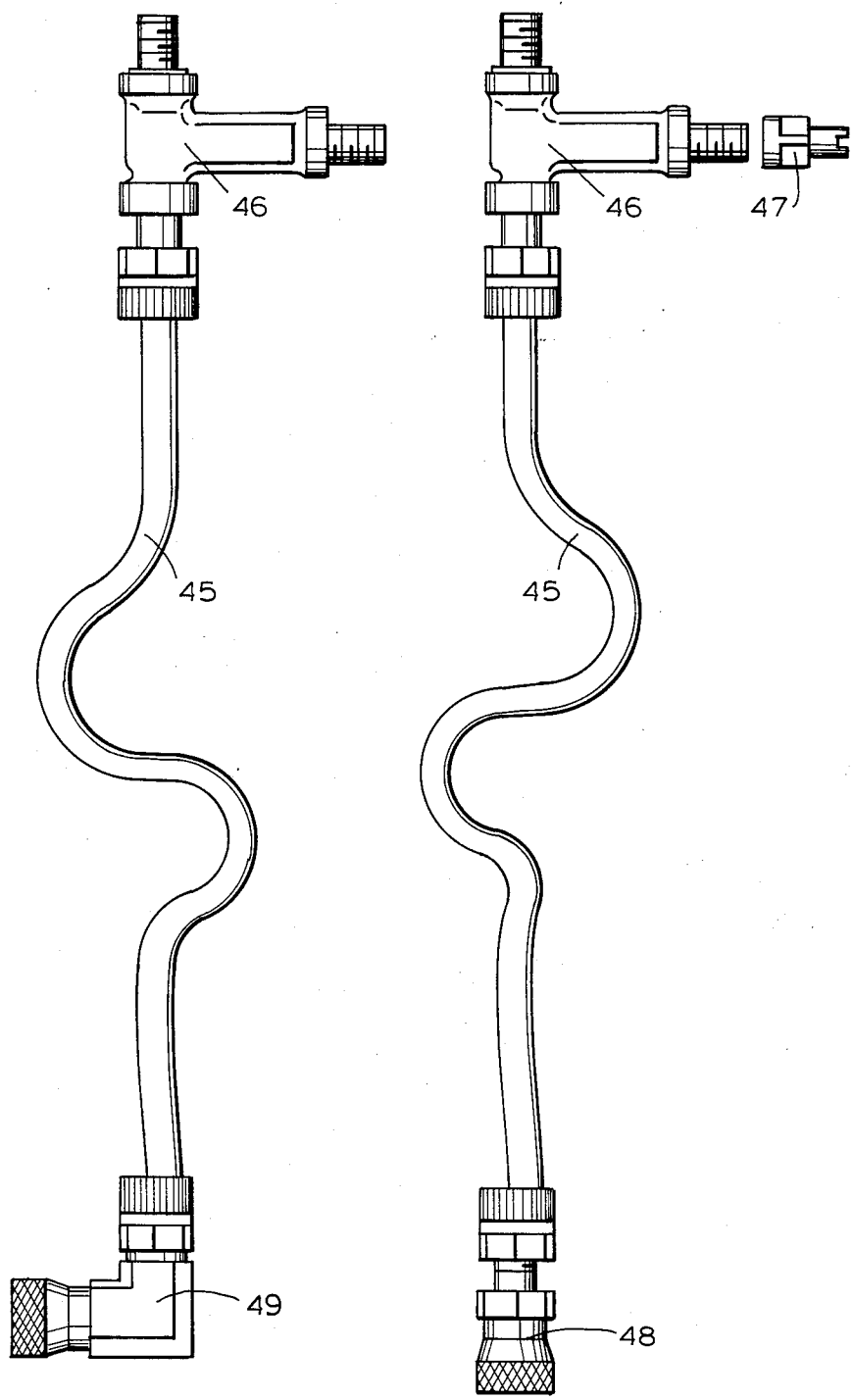
FIG. 10 shows an enlargement of the two flexible hoses shown in FIGS. 6 and 7.

FIG. 10 shows flexible hoses 45, which connect the sensor to the tires as shown in FIGS. 6 and 7. The hoses have a T connection 46 at one end to allow for the measurement and calibration of the tire pressure off a tap 47. The T connection has a port which is to be screwed into the opening 1 of the sensor. The other end of the hoses has a connection 48, 49 screwed on the tire valve stem and presses it to permit the out flow of the compressed air from the tire to the sensor. Two types of connections are shown: a right angle connection 49 for an external tire and a straight connection 48 for an internal tire.

The present invention electric pneumatic pressure sensor, whose main characteristics are simplicity and reliability provide a long period of use without trouble; eliminating losses of tires, saving up to 15% of fuel and increasing the security of the vehicle and the roads, through a correct and efficient control of the tire pressures.

The sensor has a small cylindrical body (FIGS. 1-21) inside of which the compressed air of the tire pushes a piston (1-3) against a calibrated spring (1-4) when the pressure falls below a pre-set value, the piston closes an electrical contact, actuating accoustic and optical alarms situated in the drivers cabin. These alarms do not stop until the pressure of the defective tire is corrected. The alarm avoids harm to the tire, the vehicle and its load. The sensors are mounted externally, without interfering with any mechanical part of the vehicle.

If in the future, if the consumer market accepts the idea here proposed, the sensors may come incorporated into the vehicle when originally assembled by its manufacturer.

The concept of the sensor is a very simple one and is so flexible that it can be adapted to any exigence of the mechanics of the vehicle.

I claim:

1. A vehicle tire pressure indicator device, comprising:
    a housing having a wall which has an inner surface limiting an inner chanmber;
    a tube arranged to communicate said inner chamber with an interior of a tire so as to establish in said inner chamber an air pressure corresponding to a tire air pressure, said tube being electrically isolated from said housing and formed as an electrical contact connectable with electrical indicating means, said tube having an end face;
    a piston movable in said inner chamber relative to said tube and having an outer surface and an end face;
    biasing means arranged to bias said piston toward said tube against an air pressure in said inner chamber so that when an air pressure in the tire and therefore an air pressure in said chamber reaches a predetermined level, said piston moves in said housing so that said outer surface of said piston is guided by said inner surface of said housing during an entire movement of said piston in said housing and only said end face of said piston becomes biased into contact with said end face of said tube, so that said tube activates said electrical indicating means in response to the contact of said end face of said piston with said end face of said tube; and
    means for sealing said inner chamber and including an elastic element fixedly engaged to said piston and pressing against said inner surface of said wall of said housing to thereby seal said inner chamber, said elastic element being formed so that all of said elastic element is movable by said piston, said elastic element sliding along said inner surface of said wall of said housing when moved by said piston.

2. The device as defined in claim 1; further comprising:
    said electrical indicating means; and
    means for electrically connecting said indicating means to said tube such that said indicating means is activated when said piston contacts said tube.

3. The device as defined in claim 2, wherein said indicating means is formed to be activatable upon application of an electrical command current of a very low intensity of 0.017 Amps in 12 V.D.C.

4. The device as defined in claim 2, wherein said indicating means is an accoustic alarm.

5. The device as defined in claim 2, wherein said indicating means is an optical alarm.

6. The device as defined in claim 1, wherein said tire has a central area facing outward from the vehicle; further comprising:
    a support container supporting said housing and being mountable to said tire central area from outside, said housing being arranged traversely within said support container.

7. The device as defined in claim 1, wherein said piston is movable back and forth along one line; further comprising:
    a stem extending from said piston parallel to said one line and thereby being movable with said piston and having a portion visible from outside said housing for viewing the movement of said stem.

8. The device as defined in claim 1, wherein said biasing means includes a spring and a screw for adjusting a tension of said spring to a predetermined amount so as to regulate said contact between said piston and said tube at said predetermined air pressure level.

9. The device as defined in claim 1, wherein the tire contains air and has a check pin which releases the air from the tire when engaged; and further comprising:
    second tube means connectable between said check pin and said first mentioned tube and through which the air is passable from the tire into said first mentioned tube.

10. The device as defined in claim 1, further comprising:
    means for electrically isolating said tube from said housing; and
    electrical conductive means contacting said tube such that an electrical signal is conductable from said tube through said electrical conductive means.

* * * * *